US012112703B2

(12) United States Patent
Kwon et al.

(10) Patent No.: US 12,112,703 B2
(45) Date of Patent: Oct. 8, 2024

(54) PIXEL CIRCUIT AND DISPLAY DEVICE, AND MOBILE TERMINAL INCLUDING THE DISPLAY DEVICE

(71) Applicant: LG Display Co., Ltd., Seoul (KR)

(72) Inventors: Yong Chul Kwon, Paju-si (KR); Dong Won Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/475,941

(22) Filed: Sep. 27, 2023

(65) Prior Publication Data

US 2024/0185786 A1 Jun. 6, 2024

(30) Foreign Application Priority Data

Dec. 2, 2022 (KR) ........................ 10-2022-0166344

(51) Int. Cl.

*G09G 3/32* (2016.01)
*G09G 3/20* (2006.01)
*G09G 3/30* (2006.01)
*G09G 3/3233* (2016.01)
*G09G 3/3266* (2016.01)
*G09G 3/3291* (2016.01)

(52) U.S. Cl.

CPC ......... *G09G 3/3233* (2013.01); *G09G 3/2092* (2013.01); *G09G 3/3266* (2013.01); *G09G 3/3291* (2013.01); *G09G 2300/0426* (2013.01); *G09G 2300/0819* (2013.01); *G09G 2300/0842* (2013.01); *G09G 2300/0861* (2013.01); *G09G 2310/0286* (2013.01)

(58) Field of Classification Search

CPC .. G09G 3/2092; G09G 3/3266; G09G 3/3291; G09G 3/3233; G09G 2300/0426; G09G 2300/0819; G09G 2300/0842; G09G 2300/0861; G09G 2310/0286

See application file for complete search history.

(56) References Cited

U.S. PATENT DOCUMENTS

2007/0222718 A1 9/2007 Takahara
2014/0184481 A1* 7/2014 Kim ..................... G09G 3/3258 345/82
2022/0158130 A1 5/2022 Hwang et al.
2023/0368736 A1* 11/2023 No ....................... G09G 3/3233

FOREIGN PATENT DOCUMENTS

KR 20070083199 A 8/2007
KR 20180055004 A 5/2018
KR 20220067082 A 5/2022

* cited by examiner

*Primary Examiner* — Sanghyuk Park
(74) *Attorney, Agent, or Firm* — Seed IP Law Group LLP

(57) ABSTRACT

A pixel circuit, a display device, and a mobile terminal including the display device are disclosed. The pixel circuit includes one or more first switch elements configured to be turned on in response to a first gate signal; one or more second switch elements configured to be turned on in response to a second gate signal; one or more third switch elements configured to be turned on in response to a third gate signal; an internal gate signal generator configured to receive the first gate signal and the second gate signal to output the third gate signal; and a driving element configured to drive a light emitting element.

20 Claims, 14 Drawing Sheets

PXL

| | SCAN2 | EM | SCAN1 |
|---|---|---|---|
| t1 | 0 | 0 | 1 |
| t2 | 0 | 1 | 0 |
| t3 | 1 | 0 | 1 |
| t4 | 1 | 1 | 1 |

| | EN | EM | SCAN |
|---|---|---|---|
| t12, t15 | 0 | 0 | 1 |
| t13 | 0 | 1 | 1 |
| t11 | 1 | 0 | 1 |
| t14 | 1 | 1 | 0 |

PIXEL CIRCUIT AND DISPLAY DEVICE, AND MOBILE TERMINAL INCLUDING THE DISPLAY DEVICE

CROSS-REFERENCE TO RELATED APPLICATION

This application claims priority to and the benefit of Korean Patent Application No. 10-2022-0166344, filed Dec. 2, 2022, the disclosure of which is incorporated herein by reference in its entirety.

BACKGROUND

Technical Field

The present disclosure relates to a pixel circuit, a display device, and a mobile terminal capable of implementing narrow bezels.

Description of the Related Art

An organic light-emitting display device an includes an organic light-emitting diode (hereinafter referred to as "OLED") which emits light by itself, and has an advantage that its response speed is fast and its luminous efficiency, luminance, and viewing angle are large. The organic light-emitting display device has a fast response speed, excellent luminous efficiency, luminance, and viewing angle, and has excellent contrast ratio and color reproducibility since it can express black grayscales in full black.

The organic light-emitting display device does not require a backlight unit, and may be implemented on a plastic substrate, a thin glass substrate, or a metal substrate, which is a flexible material. Accordingly, flexible displays may be implemented with organic light-emitting display devices.

BRIEF SUMMARY

In the related art, there may be differences in electrical characteristics of driving elements between pixels due to process deviations and device characteristic deviations resulting from the manufacturing process of display panels. These differences in the electrical characteristics of the pixels may increase as the driving time of the pixels elapses. To compensate for variations in the electrical characteristics of driving elements between the pixels, pixel circuits of organic light emitting display devices may be implemented with an internal compensation circuit. The internal compensation circuit may sample a threshold voltage of the driving elements and compensate a gate voltage of the driving elements by the amount of the threshold voltage of the driving elements. However, the internal compensation circuit requires many gate signals, which increases the size of the gate driving circuit on the display panel. This limits the narrow bezel designs of the organic light emitting display devices.

The various embodiments of the present disclosure address one or more technical problems in the related art including the aforementioned necessities and/or drawbacks.

The present disclosure provides a pixel circuit and a display device capable of realizing a narrow bezel of the display device, and a mobile terminal including the display device.

It should be noted that the technical benefits of the present disclosure are not limited to the above-described benefits, and other benefits of the present disclosure will be apparent to those skilled in the art from the following descriptions.

A pixel circuit according to one embodiment of the present disclosure includes: one or more first switch elements configured to be turned on in response to a first gate signal; one or more second switch elements configured to be turned on in response to a second gate signal; one or more third switch elements configured to be turned on in response to a third gate signal; an internal gate signal generator configured to receive the first gate signal and the second gate signal to output the third gate signal; and a driving element configured to drive a light emitting element. The first to third switch elements are electrically connected to the driving element.

A pixel circuit according to another embodiment of the present disclosure includes: one or more first switch elements configured to be turned on in response to a first gate signal; one or more second switch elements configured to be turned on in response to a second gate signal; an internal gate signal generator configured to receive an enable signal and the first gate signal to output the second gate signal; and a driving element configured to drive a light emitting element. The switch elements are electrically connected to the driving element.

A display panel according to one embodiment of the present disclosure includes: a display panel in which a plurality of data lines, a plurality of gate lines, and a plurality of pixel circuits are disposed; a data driver configured to output a data voltage of pixel data; and a gate driver configured to output a gate signal. At least one of the pixel circuits includes an internal gate signal generator configured to output an internal gate signal.

A mobile terminal according to one embodiment of the present disclosure includes: a display panel in which a plurality of data lines, a plurality of gate lines, and a plurality of pixel circuits are disposed; a drive IC configured to output a data voltage of pixel data; a gate driver configured to output a gate signal; and a host system configured to supply the pixel data to the drive IC. At least a portion of the gate driver is disposed in a bezel area of the display panel. At least one of the pixel circuits includes an internal gate signal generator configured to output an internal gate signal.

According to the present disclosure, it may be possible to reduce the circuit size of the gate driver by outputting the gate signal within the pixel circuit and to reduce the bezel area, which is a non-display area, in the display device and the mobile terminal.

According to the present disclosure, it may be possible to lower power of display device since a power consumption for driving the gate driver can be reduced.

According to the present disclosure, it may be possible to reduce the number of the gate lines connected to the pixel circuit.

According to the present disclosure, it may be possible to reduce the number of the gate lines through which the gate signals are applied to the pixel circuit in the display device requiring a reduction in the number of wires, such as a stretchable display, thereby improving the reliability and lifetime of the stretchable display.

Effects which can be achieved by the present disclosure are not limited to the above-mentioned effects. That is, other objects that are not mentioned may be obviously understood by those skilled in the art to which the present disclosure pertains from the following description.

BRIEF DESCRIPTION OF THE SEVERAL VIEWS OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
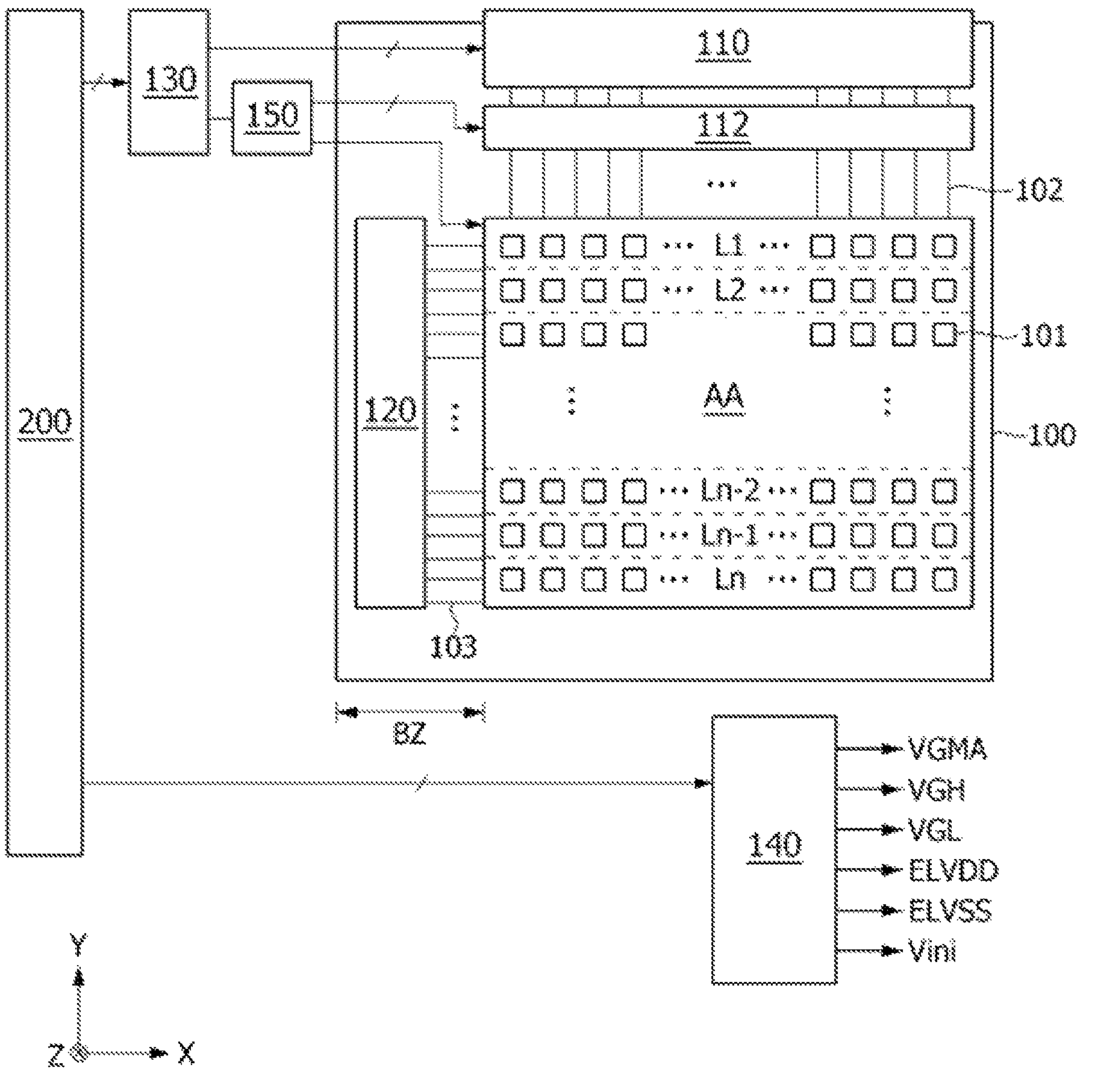
FIG. 1 is a block diagram illustrating a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising.” “including.” “having.” and “consist of” used herein are generally intended to allow other components to be added unless the terms are used with the term “only.” Any references to singular may include plural unless expressly stated otherwise.

Components are interpreted to include an ordinary error range even if not expressly stated.

When a positional or interconnected relationship is described between two components, such as “on top of,” “above,” “below,” “next to,” “connect or couple with,” “crossing,” “intersecting,” or the like, one or more other components may be interposed between them, unless “immediately” or “directly” is used.

When a temporal antecedent relationship is described, such as “after,” “following,” “next to,” “before,” or the like, it may not be continuous on a time base unless “immediately” or “directly” is used.

The terms “first,” “second,” and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

In a display device of the present disclosure, a pixel circuit and a gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like. Further, each of the transistors may be implemented as a p-channel TFT or an n-channel TFT.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In case of an n-channel transistor, a gate-on voltage may be a gate high voltage VGH, and a gate-off voltage may be a gate low voltage VGL. In case of a p-channel transistor, a gate-on voltage may be a gate low voltage VGL, and a gate-off voltage may be a gate high voltage VGH.

Hereinafter, various embodiments of the present disclosure will be described in detail with reference to the accompanying drawings.

Figure 2:
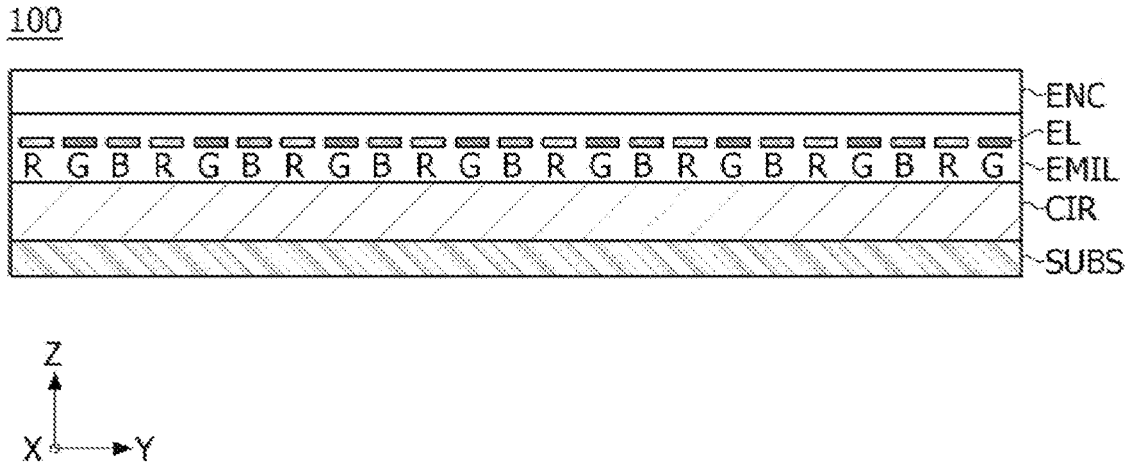
FIG. 2 is a cross-sectional view illustrating a cross-sectional structure of the display panel shown in FIG. 1.
Figure 3:
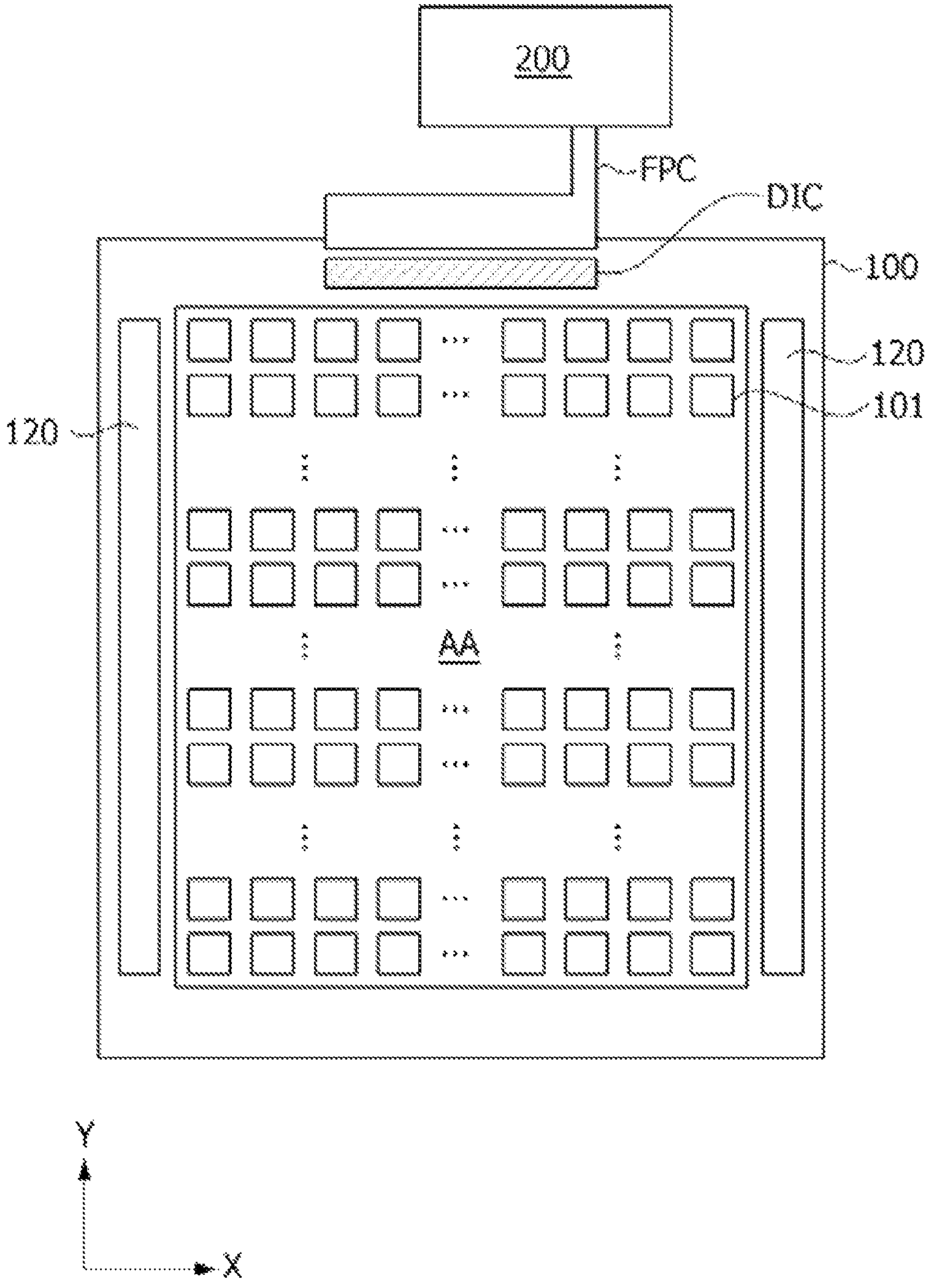
FIG. 3 is a diagram schematically illustrating a mobile terminal.

FIG. 1 is a block diagram illustrating a display device according to one embodiment of the present disclosure. FIG. 2 is a cross-sectional view illustrating a cross-sectional structure of the display panel shown in FIG. 1. FIG. 3 is a diagram schematically illustrating a mobile terminal.

Referring to FIGS. 1 to 3, the display device according to an embodiment of the present disclosure includes a display panel 100, a display panel driving circuit for writing pixel data to pixels of the display panel 100, and a power supply 140 for generating power necessary for driving the pixels and the display panel driving circuit.

The display panel 100 may be a panel having a rectangular structure with a length in the X-axis direction, a width in the Y-axis direction, and a thickness in the Z-axis direction. A display area AA on the display panel 100 includes a pixel array for displaying an input image thereon. The pixel array includes a plurality of data lines 102, a plurality of gate lines 103 intersecting the data lines 102, and pixels 101 arranged in a matrix form. The display panel 100 may further include power lines commonly connected to the pixels 101. The power lines are connected to constant voltage nodes of the pixel circuits and supply a constant voltage necessary for driving the pixels 101 to the pixels 101.

Each of the pixels 101 may be divided into a red sub-pixel, a green sub-pixel, and a blue sub-pixel for color implementation. Each of the pixels may further include a white sub-pixel. Each of the sub-pixels includes a pixel circuit for driving a light-emitting element. Each of the pixel circuits is connected to data lines, gate lines, and power lines.

The pixels may be disposed as real color pixels and pentile pixels. A pentile pixel may realize a higher resolution than the real color pixel by driving two sub-pixels having different colors as one pixel 101 through the use of a preset pixel rendering algorithm. Pixel rendering algorithms may compensate for insufficient color representation in each pixel with the color of light emitted from an adjacent pixel.

The pixel array includes a plurality of pixel lines L1 to Ln. Each of the pixel lines L1 to Ln includes one line of pixels arranged along the line direction (X-axis direction) in the pixel array of the display panel 100. Sub-pixels arranged in one pixel line share the gate lines 103. Sub-pixels arranged in the column direction Y along a data line direction share the same data line 102. One horizontal period is a time obtained by dividing one frame period by the total number of the pixel lines L1 to Ln.

The display panel 100 may be implemented as a non-transmissive display panel or a transmissive display panel. The transmissive display panel may be applied to a transparent display device in which an image is displayed on a screen and an actual background is visible. The display panel 100 may be manufactured as a flexible display panel. The display panel may be implemented as a stretchable display panel that can be flexibly stretched.

The cross-sectional structure of the display panel 100 may include a circuit layer CIR, a light-emitting element layer EMIL, and an encapsulation layer ENC stacked on a substrate SUBS, as shown in FIG. 2.

The circuit layer CIR may include a thin-film transistor (TFT) array including a pixel circuit connected to wirings such as a data line, a gate line, a power line, and the like, a de-multiplexer array 112, and a gate driver 120. The circuit layer CIR includes a plurality of metal layers insulated with insulating layers interposed therebetween, and a semiconductor material layer.

The light-emitting element layer EMIL may include a light-emitting element driven by the pixel circuit. The light-emitting element may include a light-emitting element of a red sub-pixel, a light-emitting element of a green sub-pixel, and a light-emitting element of a blue sub-pixel. The light-emitting element layer EMIL may further include a light-emitting element of white sub-pixel. The light-emitting element layer EMIL corresponding to each of the sub-pixels may have a structure in which a light-emitting element and a color filter are stacked. The light-emitting elements EL in the light-emitting element layer EMIL may be covered by multiple protective layers including an organic film and an inorganic film.

The encapsulation layer ENC covers the light-emitting element layer EMIL to seal the circuit layer CIR and the light-emitting element layer EMIL. The encapsulation layer ENC may also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light-emitting element layer EMIL may be effectively blocked.

A touch sensor layer (not shown) may be formed on the encapsulation layer ENC, and a polarizing plate or a color filter layer may be disposed thereon. The touch sensor layer may include capacitive touch sensors that sense a touch input based on a change in capacitance before and after the touch input. The touch sensor layer may have metal wiring patterns and insulating films that form the capacitance of the touch sensors. The insulating films may insulate an area where the metal wiring patterns intersect and may planarize the surface of the touch sensor layer. The polarizing plate may improve visibility and contrast ratio by converting the polarization of external light reflected by metal in the touch sensor layer and the circuit layer. The polarizing plate may be implemented as a circular polarizing plate or a polarizing plate in which a linear polarizing plate and a phase retardation film are bonded together. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer, and increase the color purity of an image reproduced in the pixel array.

The power circuit 140 generates a DC voltage (or a constant voltage) necessary for driving the pixel array of the display panel 100 and the display panel driving circuit using a DC-DC converter. The DC-DC converter may include a charge pump, a regulator, a buck converter, a boost converter, and the like. The power circuit 140 may adjust the level of a DC input voltage applied from the host system 200 to generate constant voltage such as a gamma reference voltage VGMA, a gate-on voltage VGL, a gate-off voltage VGH, a pixel driving voltage ELVDD, a pixel reference voltage ELVSS, an initialization voltage Vini, a reference voltage Vref, and the like. The gamma reference voltage VGMA is supplied to the data driver 110. The dynamic range of the data voltage outputted from the data driver 110 is determined by the voltage range of the gamma reference voltage. The dynamic range of the data voltage is a voltage range between the highest grayscale voltage and the lowest grayscale voltage, and the voltage level is selected by the grayscale value of the pixel data. The voltage level outputted from the power circuit 140 may be adjusted under the control of a control circuit such as the host system 200 or the timing controller 130. Hereinafter, the control circuit may be interpreted as the host system 200 and/or the timing controller 130.

A gate high voltage VGH and a gate low voltage VGL are supplied to a level shifter 150 and a gate driver 120. Constant voltages such as a pixel driving voltage ELVDD, a pixel base voltage ELVSS, an initialization voltage Vini, and a reference voltage Vref are supplied to the pixels 101 via the power lines commonly connected to the pixels 101.

The pixel driving voltage EVDD may be outputted from a main power source of the host system 200 and supplied to the display panel 100. In this case, the pixel driving voltage ELVDD does not need to be outputted from the power circuit 140.

The display panel driving circuit writes pixel data of an input image to the pixels of the display panel 100 under the control of the timing controller 130. The display panel driving circuit includes the data driver 110 and the gate driver 120. The display panel driving circuit may further include a de-multiplexer array 112 disposed between the data driver 110 and the data lines 102.

The de-multiplexer array 112 sequentially supplies the data voltages outputted from channels of the data driver 110 to the data lines 102 using a plurality of de-multiplexers DEMUX. The de-multiplexer may include a multiple of switch elements disposed on the display panel 100. When the de-multiplexer is disposed between the output terminals of the data driver 110 and the data lines 102, the number of channels of the data driver 110 may be reduced. The de-multiplexer array 112 may be omitted.

The display panel driving circuit may further include a touch sensor driver for driving touch sensors. The touch sensor driver is omitted from FIG. 1. The data driver 110 and the touch sensor driver may be integrated into one drive IC (Integrated Circuit). In a mobile terminal or a wearable terminal, the timing controller 130, the level shifter 150, the data driver 110, the touch sensor deriver, and the like may be integrated into one drive IC (DIC) as shown in FIG. 3.

The data driver 110 receives pixel data of an input image received as a digital signal from the timing controller 130 and outputs a data voltage. The data driver 110 converts the pixel data of an input image into a gamma compensation voltage and outputs the data voltage at each frame period in a normal driving mode using a digital-to-analogue converter (DAC). The gamma reference voltage VGMA is divided by a voltage divider circuit into a gamma compensation voltage for each grayscale. The gamma compensation voltage for each grayscale is provided to the DAC in the data driver 110. The data voltage is outputted via an output buffer from each of the channels of the data driver 110.

The gate driver 120 may be formed in the circuit layer CIR on the display panel 100 together with the TFT array of the pixel array and the wirings. The gate driver 120 may be disposed in a bezel BZ, which is non-display region of the display panel 100, or may be distributed and disposed in a pixel array in which an input image is reproduced.

The gate driver 120 may be disposed in the bezel BZ on opposite sides of the display panel 100 with the display area of the display panel interposed therebetween and may supply gate pulses from the opposite sides of the gate lines 103 in a double feeding method. In another embodiment, the gate driver 120 may be disposed on either the left or right bezel of the display panel 100 to supply gate signals to the gate lines GL in a single feeding method. The gate driver 120 sequentially outputs pulses of the gate signals to the gate lines 103 under the control of the timing controller 130. The gate driver 120 may sequentially supply the gate signals to the gate lines 103 by shifting pulses of the gate signals using a shift register.

The gate driver 120 may include a plurality of shift registers that output pulses of the gate signals. In the case of the pixel circuit shown in FIG. 5, the gate driver 120 may include a first gate driver 121 which sequentially outputs scan signals [SCAN(N−1) and SCAN(N)] synchronized with the data voltage of pixel data, and a second gate driver 122 which sequentially outputs an emission control signal [EM(N)] (hereinafter, referred to as "EM signal"). The scan signals [SCAN(N−1) and SCAN(N)] are applied to scan lines among the gate lines 103. The EM signal is applied to emission control lines among the gate lines 103. In the case of the pixel circuit in FIG. 5, first and second gate lines GL1 and GL2 are scan lines, and third gate line GL3 is an emission control line. The first and second gate drivers 121 and 122 output the scan signals [SCAN(N−1) and SCAN (N)] and the EM signal [EM(N)] during a refresh frame or a refresh period under the control of the timing controller 130. During a period of a skip frame or a skip period, the first gate driver 121 may not generate its output and the second gate driver 122 may output the EM signal [EM(N)].

The timing controller 130 receives from the host system 200 digital video data of an input image and timing signals synchronized with this data. The timing signals may include a vertical synchronization signal Vsync, a horizontal synchronization signal Hsync, a clock CLK, and a data enable signal DE. Since a vertical period and a horizontal period may be known by counting the data enable signal DE, the vertical synchronization signal Vsync and the horizontal synchronization signal Hsync may be omitted. The data enable signal DE has a cycle of one horizontal period (1H).

A timing controller 130 may supply pixel data of an input image and control the gate driver 120 and an internal gate signal generator embedded in the pixel circuit.

The timing controller 130 generates a data timing control signal for controlling the operation timing of the data driver 110 based on the timing signals Vsync, Hsync, and DE received from the host system 200, a MUX control signal for controlling the operation timing of the de-multiplexer array 112, and a gate timing control signal for controlling the operation timing of the gate driver 120. The timing controller 130 synchronizes the data driver 110, the de-multiplexer array 112, the touch sensor driver, and the gate driver 120 by controlling the operation timings of the display panel driving circuit. The gate timing control signal and the MUX control signal generated by the timing controller 130 may be inputted to the shift register of the gate driver 120 through the level shifter 150.

The level shifter 150 may receive the gate timing control signal and generate a start pulse and a shift clock to provide them to the gate driver 120. The level shifter 150 may increase the swing width of the MUX control signal from the timing controller 130 and feed it to the de-multiplexer array 112. The level shifter 150 may receive the gate timing control signal as input and increase the swing width thereof to output an enable signal EN.

The host system 200 may include a main board of any one of a television (TV) system, a set-top box, a navigation system, a personal computer (PC), a vehicle system, a mobile terminal, and a wearable terminal. The host system may scale an image signal from a video source to match the resolution of the display panel 100, and may transmit it to the timing controller 130 together with the timing signal.

In a mobile system, the host system 200 may be implemented by an application processor (AP). The host system 200 may transmit pixel data of an input image to a drive IC (DIC) through a Mobile Industry Processor Interface (MIPI). The drive IC (DIC) may output a shift clock to control the gate driver 120, and an enable signal EN to control the internal gate signal generator. The host system 200 may be connected to the drive IC (DIC) via a flexible printed circuit, for example, a flexible printed circuit (FPC), as shown in FIG. 3. The drive IC may be attached on the display panel 100 in a COG (Chip on Glass) process.

Figure 4:
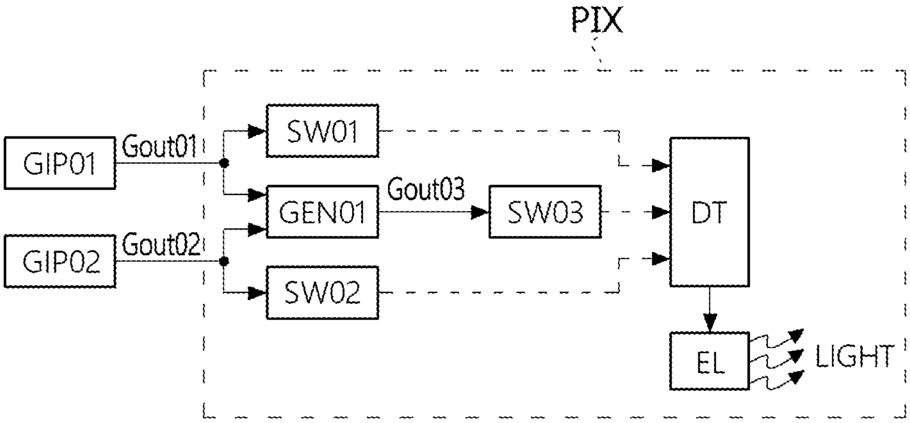
FIG. 4 is a diagram schematically illustrating a pixel circuit according to one embodiment of the present disclosure.

FIG. 4 is a diagram schematically illustrating a pixel circuit PIX according to one embodiment of the present disclosure. In FIG. 4, wires such as data lines, gate lines, and power lines connected to the pixel circuit PIX are omitted.

Referring to FIG. 4, the pixel circuit PIX includes one or more switch elements SW01 that are turned on in response to a first gate signal Gout01, one or more switch elements SW02 that are turned on in response to a second gate signal Gout02, and one or more switch elements SW03 that are turned on in response to a third gate signal Gout03, an internal gate signal generator GEN01 that receives the first gate signal Gout01 and the second gate signal Gout02 and outputs the third gate signal Gout03, a light emitting element EL, and a driving element DT that drives the light emitting element EL. Each of the switch elements SW01, SW02, and SW03 and the driving element DT may be implemented as a transistor.

The light emitting element EL may be implemented as an OLED. The light emitting element EL includes an anode electrode, a cathode electrode, and an organic compound layer formed between the anode and cathode electrodes. The organic compound layer may include, but is not limited to, a hole injection layer HIL, a hole transport layer HTL, a light emission layer EML, an electron transport layer ETL, and an electron injection layer EIL. When a voltage is applied to the anode and cathode electrodes of the light emitting element EL, holes passing through the hole transport layer (HTL) and electrons passing through the electron transport layer (ETL) move to the emission layer (EML) to form excitons. In this case, visible light is emitted from the light emission layer EML. The light emitting element EL may be implemented as a tandem structure with a plurality of light emitting layers stacked on top of each other. The light emitting element EL having the tandem structure may improve the luminance and lifespan of pixels.

The gate driver 120 shown in FIG. 1 includes a first gate driver GIP01 that outputs the first gate signal Gout01, and a second gate driver GIP02 that outputs the second gate signal Gout02. The first gate driver GIP01 may shift the first gate signal Gout01 using a first shift register. The second gate driver GIP02 may shift the second gate signal Gout02 using a second shift register.

The switch elements SW01, SW02, and SW03 may constitute the internal compensation circuit that compensates for changes in the electrical characteristics of the driving element DT in real time. The switch elements SW01, SW02, and SW03 are electrically connected to the drive element DT. The switch elements SW01, SW02, and SW03 and the driving element DT may be connected with other circuit elements such as capacitors interposed therebetween. Further, the switch elements SW01, SW02, and SW03 may be electrically connected to each other.

The switch elements SW01, SW02, and SW03 may apply the data voltage of pixel data to a capacitor (not shown) and/or the driving element DT, and may connect the driving element DT and the light emitting element EL to appropriate nodes in response to the gate signals Gout01, Gout02, and Gout03 for each internal compensation stage during the driving period of the pixel circuit.

The internal gate signal generator GEN01 receives the first and second gate signals Gout01 and Gout02 as input using one or more logic gates and outputs the third gate signal Gout03 including a pulse different from phases and pulse widths of the first and second gate signals Gout01 and Gout02. The third switch element SW03 is turned on/off in response to the third gate signal Gout03. The internal gate signal generator GEN01 need not be added to every sub-pixel. For example, the internal gate signal generator GEN01 may be added to any one sub-pixel disposed in a pixel line, and the third gate signal Gout03 outputted from the internal gate signal generator GEN01 may be transmitted to neighboring sub-pixels via wire. For example, the internal gate signal generator GEN01 may be disposed in one sub-pixel or i sub-pixels among the sub-pixels disposed in one pixel line. Here, i is a positive integer less than the total number of sub-pixels disposed in one pixel line and greater than zero.

Figure 5:
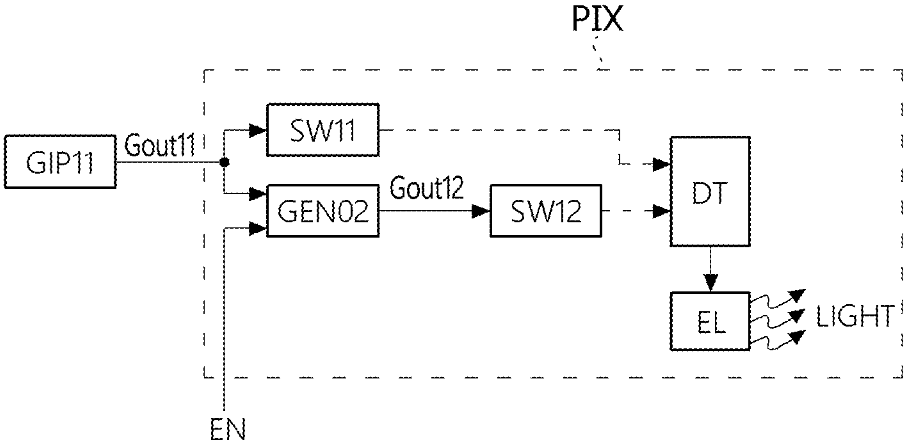
FIG. 5 is a diagram schematically illustrating a pixel circuit according to another embodiment of the present disclosure.

FIG. 5 is a diagram schematically illustrating a pixel circuit PIX according to another embodiment of the present disclosure. In FIG. 5, wires such as data lines, gate lines, and power lines connected to the pixel circuit PIX are omitted.

Referring to FIG. 5, the pixel circuit PIX includes one or more switch elements SW11 that are turned on in response to a first gate signal Gout11, one or more switch elements SW12 that are turned on in response to a second gate signal Gout12, an internal gate signal generator GEN02 that receives the first gate signal Gout11 and an enable signal EN and outputs the second gate signal Gout12, a light emitting element EL, and a driving element DT that drives the light emitting element EL. Each of the switch elements SW11 and SW12 and the driving element DT may be implemented as a transistor.

The gate driver 120 shown in FIG. 1 includes a first gate driver GIP11 that outputs and shifts the first gate signal Gout11 using a shift register. The level shifter 150 may receive the gate timing control signal from the timing controller 130 as input and output the enable signal EN. The gate timing control signal generated by the timing controller 130 may include rising and pulse width information of the enable signal.

The switch elements SW11 and SW12 may constitute the internal compensation circuit that compensates for changes in electrical characteristics of the driving element DT in real time. The switch elements SW11 and SW12 may be electrically connected to the driving element DT and the light emitting element EL. The switch elements SW11 and SW12 and the driving element DT may be connected with other circuit elements such as capacitors interposed therebetween. The switch elements SW11 and SW12 may be electrically connected to each other.

The switch elements SW11 and SW12 may apply the data voltage of pixel data to a capacitor (not shown) and/or the driving element DT, and may connect the driving element DT and the light emitting element EL to appropriate nodes in response to the gate signals Gout11 and Gout12 for each internal compensation stage during the driving period of the pixel circuit.

The internal gate signal generator GEN02 receives the first gate signal Gout11 and the enable signal EN as input using one or more logic gates, and outputs the second gate signal Gout12 including a pulse having a different phase and pulse width from the first gate signal Gout11 as a logical combination of the input signals Gout11, EN. Since the enable signal EN is generated independently of the gate signal Gout11 outputted from the gate drive part 120, phase, pulse width, waveform, etc., may be freely generated. Therefore, a phase, pulse width, waveform, etc., of the second gate signal Gout12 may be controlled in various forms according to the enable signal EN. The second switch element SW12 is turned on/off in response to the second gate signal Gout12. The internal gate signal generator GEN02 need not be added to every sub-pixel. For example, the internal gate signal generator GEN02 may be disposed in one sub-pixel or i sub-pixels among the sub-pixels disposed in one pixel line. Here, i is a positive integer less than the total number of sub-pixels disposed in one pixel line and greater than zero.

Figure 6:
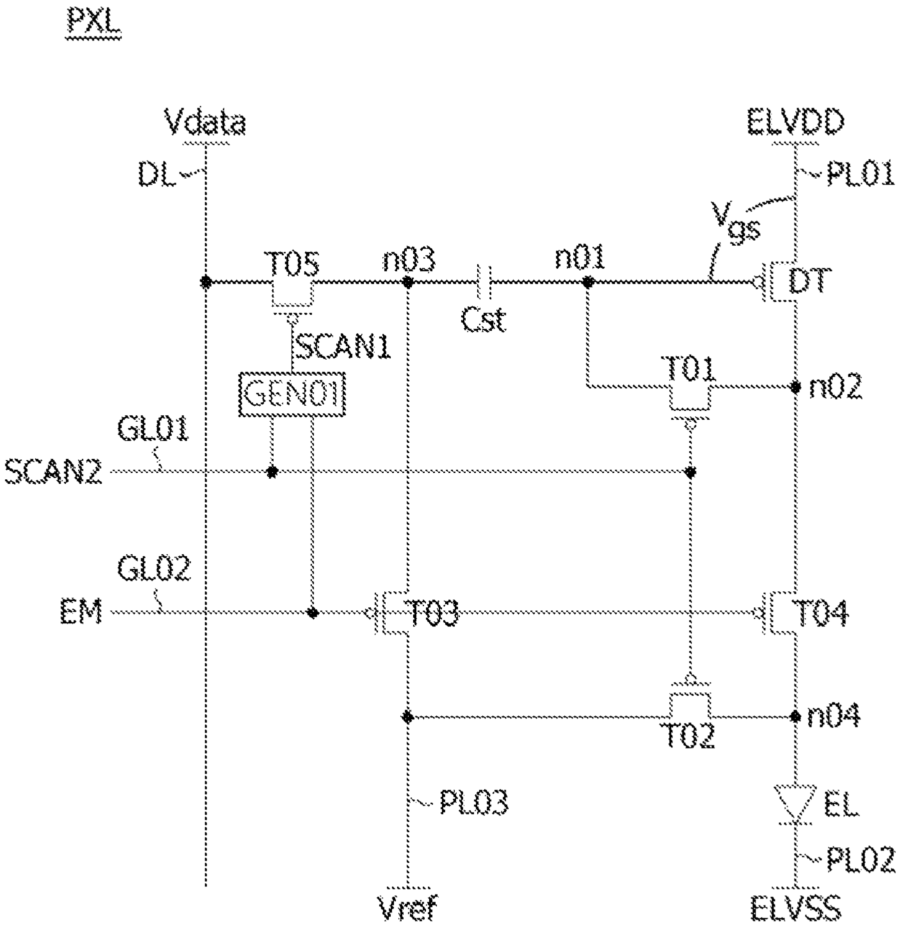
FIG. 6 is a circuit diagram illustrating a pixel circuit in detail according to one embodiment of the present disclosure.
Figure 7:
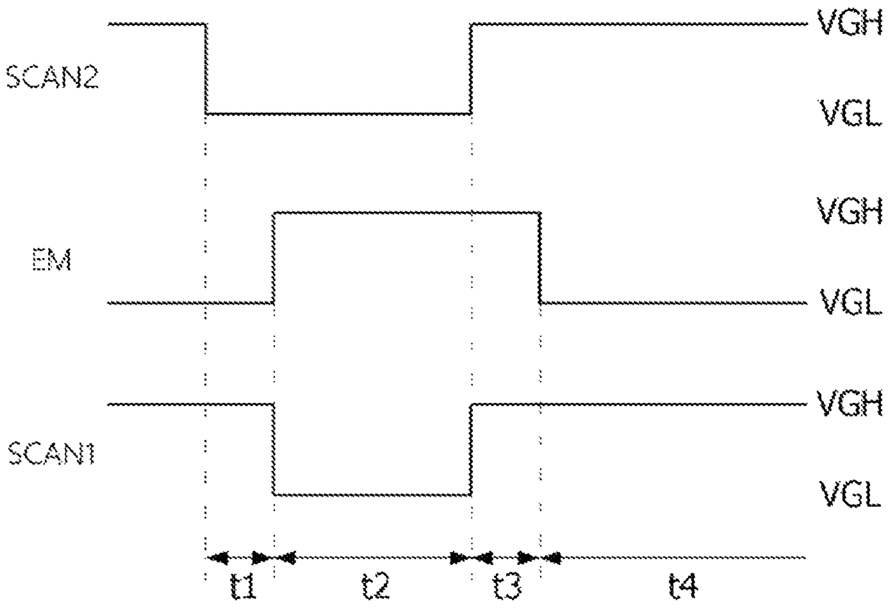
FIG. 7 is a waveform diagram illustrating gate signals inputted to the pixel circuit shown in FIG. 6.

FIG. 6 is a circuit diagram illustrating a pixel circuit PXL in detail according to one embodiment of the present disclosure. It should be noted that this pixel circuit is merely an example to which the pixel circuit PXL of the embodiment shown in FIG. 4 is applied, but is not limited thereto. FIG. 7 is a waveform diagram illustrating gate signals inputted to the pixel circuit PXL shown in FIG. 6.

Referring to FIGS. 6 and 7, the pixel circuit PXL includes a light emitting element EL, a driving element DT for driving the emitting element EL, a plurality of switch elements T01 to T05, a capacitor Cst, and an internal gate signal generator GEN01. The driving element DT and the switch elements T01 to T05 may be implemented as, but not limited to, p-channel transistors.

The pixel circuit PXL is connected to a data line DL to which a data voltage Vdata is applied, and to gate lines GL01 and GL02 to which gate signals SCAN2 and EM are applied. The pixel circuit is connected to power nodes to which DC voltages (or constant voltages) are applied, such as a first constant voltage node to which a pixel driving voltage ELVDD is applied, a second constant voltage node PL02 to which a pixel base voltage ELVSS is applied, and a third constant voltage node PL03 to which a reference voltage Vref is applied. On the display panel 100, the power lines to which the constant voltage nodes are connected may be commonly connected to all pixels.

The gate signals SCAN1, SCAN2, and EM include pulses that swing between the gate low voltage VGL and the gate high voltage VGH. A first scan signal SCAN1 corresponds to the third gate signal Gout03 shown in FIG. 4. A second scan signal SCAN2 corresponds to the first gate signal Gout01 shown in FIG. 4. An emission control signal (hereinafter referred to as "EM signal") EM corresponds to the second gate signal Gout02 shown in FIG. 4.

The switch elements T01 to T05 constitute an internal compensation circuit. The internal compensation circuit initializes the pixel circuit PXL during an initialization period t1, and then stores the data voltage Vdata compensated by the amount of the threshold voltage of the driving element DT in the capacitor Cst during sensing periods t2 and t3. Subsequently, during a light emission period t4, the current generated from the driving element DT according to a gate-source voltage Vgs of the driving element DT is supplied to the light emitting element EL to drive the light emitting element EL.

During the initialization period t1, the second scan signal SCAN2 and the EM signal EM are at the gate low voltage VGL and the first scan signal SCAN1 is at the gate high voltage VGH. During the initialization period t1, the first to fourth switch elements T01 to T04 are turned on, and the fifth switch element T05 is turned off.

During a period t2 of the sensing periods t2 and t3, the first and second scan signals SCAN1 and SCAN2 are at the gate low voltage VGL, and the EM signal EM is at the gate high voltage VGH. During the period t2, the first, second, and fifth switch elements T01, T02, and T5 are turned on, and the third and fourth switch elements T03 and T04 are turned off. During a period t3, the gate signals SCAN1, SCAN2, and EM are the gate high voltage VGH. Accordingly, at the period t3, the first to fifth switch elements T01 to T05 are turned off, causing the major nodes n01 to n4 to float.

During a light emission period t4, the EM signal EM is at the gate low voltage VGL, and the first and second scan signals SCAN1 and SCAN2 are at the gate high voltage VGH. During the light emission period t4, the third and fourth switch elements T03 and T04 are turned on, and the first, second, and fifth switch elements T01. T02, and T05 are turned off.

The driving element DT drives the light emitting element EL by supplying current to the light emitting element EL according to the gate-source voltage Vgs. The driving element DT includes a first electrode connected to the first constant voltage node PL1, a gate electrode connected to a first node n01, and a second electrode connected to a second node n02. The capacitor Cst is connected between the first node n01 and a third node n03.

The light emitting element EL includes an anode electrode connected to a fourth node n04, a cathode electrode connected to a second constant voltage node PL02 to which the pixel base voltage ELVSS is applied, and an organic compound layer interposed between the anode electrode and the cathode electrode. The light emitting element EL may be driven by the current from the driving element DT to emit light with a brightness corresponding to a gray scale value of the pixel data.

The first switch element T01 is turned on according to the gate low voltage VGL of the second scan signal SCAN2 to connect the first node n01 to the second node n02. The first switch element T01 includes a first electrode connected to the first node n01, a gate electrode connected to the first gate line GL01 to which the second scan signal SCAN2 is applied, and a second electrode connected to the second node n02.

The second switch element T02 is turned on according to the second scan signal SCAN2 to connect the fourth node n04 to the third constant voltage node PL03 to which the reference voltage Vref is applied. The second switch element T02 includes a first electrode connected to the third constant voltage node PL03, a gate electrode connected to the first gate line GL01, and a second electrode connected to the fourth node n04.

The third switch element T03 is turned on according to the gate low voltage VGL of the EM signal EM to connect the third node n03 to the third constant voltage node PL03 to which the reference voltage Vref is applied. The third switch element T03 includes a first electrode connected to the third node n03, a gate electrode connected to the second gate line GL02 to which the EM signal EM is applied, and a second electrode connected to the third constant voltage node PL03.

The fourth switch element T04 is turned on according to the gate low voltage VGL of the EM signal EM to connect the second node n02 to the fourth node n04. The fourth switch element T04 includes a first electrode connected to the second node n02, a gate electrode connected to the second gate line GL02, and a second electrode connected to the fourth node n04.

The internal gate signal generator GEN01 receives the second scan signal SCAN2 and the EM signal EM as input and outputs the first scan signal SCAN1. The fifth switch element T05 is turned on according to the gate low voltage VGL of the first scan signal SCAN1 to apply the data voltage Vdata to the third node n03. The fifth switch element T05 includes a first electrode connected to the data line DL to which the data voltage of the pixel data is applied, a gate electrode to which the first scan signal SCAN1 from the internal gate signal generator GEN01 is applied, and a second electrode connected to the third node n03.

Figure 8:
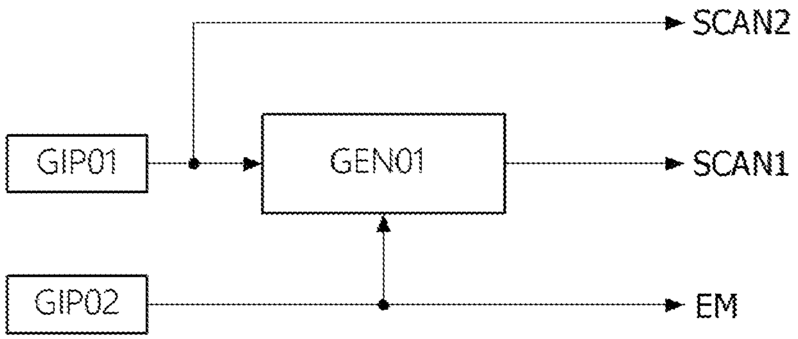
FIG. 8 is a block diagram schematically illustrating the gate driver and the internal gate signal generator that output the gate signals shown in FIGS. 6 and 7.

FIG. 8 is a block diagram schematically illustrating the gate driver and the internal gate signal generator that output the gate signals shown in FIGS. 6 and 7.

Referring to FIG. 8, a first gate driver GIP01 outputs the second scan signal SCAN2. A second gate driver GIP02 outputs the EM signal EM. The internal gate signal generator GEN01 embedded in the pixel circuit may receive the second scan signal SCAN2 and the EM signal EM as input and output the first scan signal SCAN1 using one or more logic gates.

Figure 9:
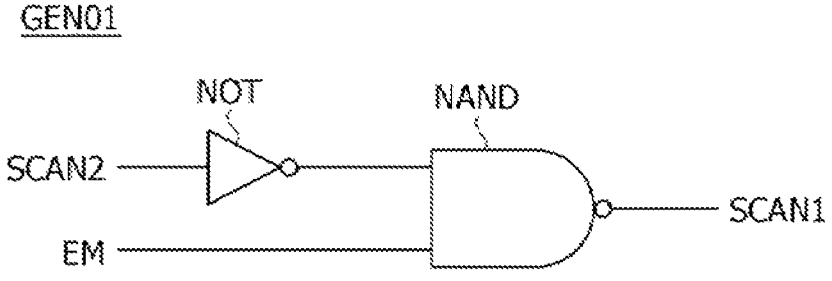
FIG. 9 is a circuit diagram schematically illustrating logic gates and a truth table of the internal gate signal generator shown in FIG. 8.

FIG. 9 is a circuit diagram schematically illustrating logic gates and a truth table of the internal gate signal generator GEN01 shown in FIG. 8.

Referring to FIG. 9, the internal gate signal generator GEN01 includes a NOT gate NOT that inverts the first scan signal SCAN1, and a NAND gate NAND that receives the output signal of the NOT gate and an EM signal EM as input and outputs the first scan signal SCAN1.

The truth table below in FIG. 9 shows the inputs and outputs of the internal gate signal generator GEN01 in which the NOT gate NOT and the NAND gate NAND are combined. In FIG. 7, when the gate low voltage VGL is '0' and the gate high voltage VGH is '1', the logical values of the waveform for each section of the waveform diagram shown in FIG. 7 coincide with the truth table shown in FIG. 9.

Figure 10:
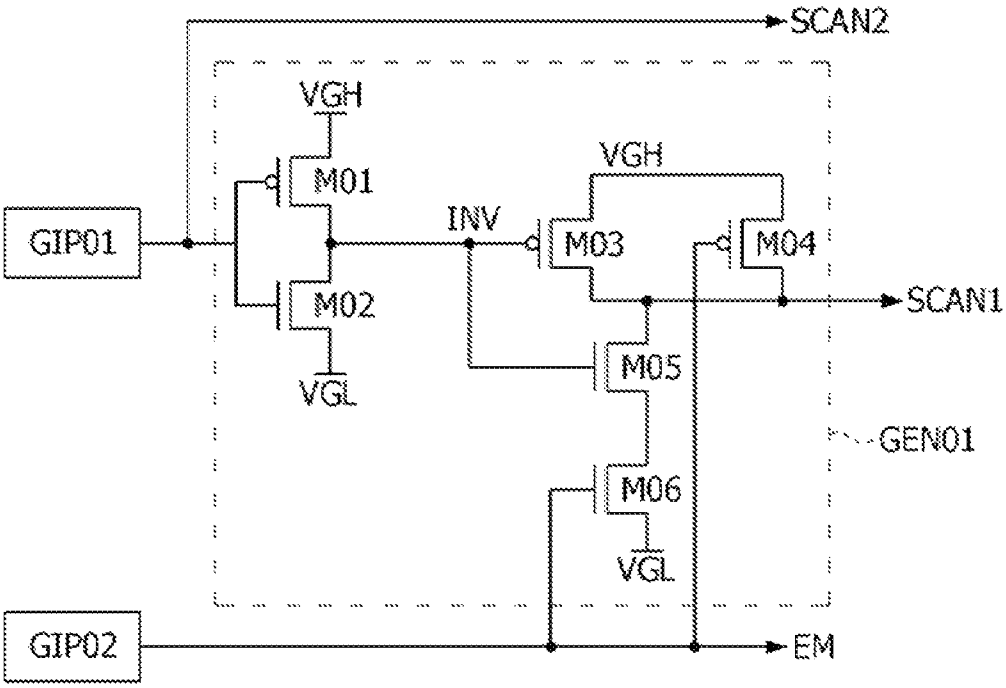
FIGS. 10 to 12 are circuit diagrams illustrating in detail the internal gate signal generator shown in FIG. 9.
Figure 11:
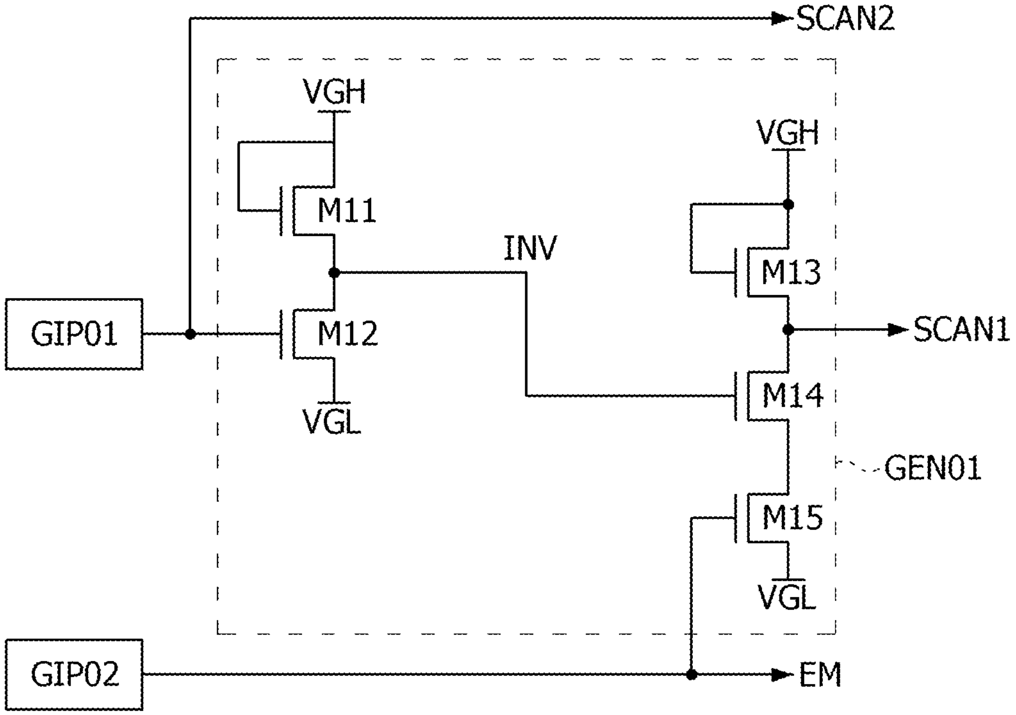
Figure 12:
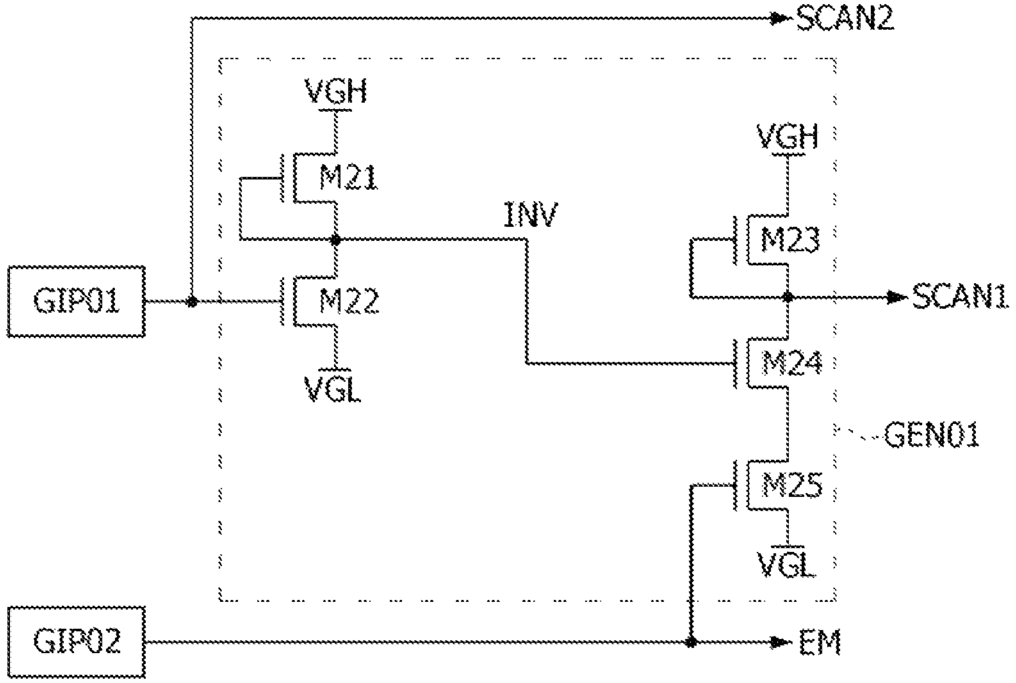

FIGS. 10 to 12 are circuit diagrams illustrating in detail the internal gate signal generator shown in FIG. 9.

Referring to FIGS. 9 and 10, the internal gate signal generator GEN01 includes first to sixth transistors M01 to M06. First, third, and fourth transistors M01, M03, and M04 may be p-channel transistors, and the other transistors M02, M05, and M06 may be n-channel transistors.

The NOT gate NOT includes the first and second transistors M01 and M02. The first transistor M01 is turned on according to the gate low voltage VGL of the second scan signal SCAN2 to apply the gate high voltage VGH to an inverting output node INV from which an inverted signal of the second scan signal SCAN2 is outputted, while the second transistor M02 is turned on according to the gate high voltage VGL of the second scan signal SCAN to apply the gate low voltage VGL to the inverting output node INV. The first transistor M01 includes a first electrode to which the gate high voltage VGH is applied, a gate electrode to which the second scan signal SCAN2 is applied, and a second electrode connected to the inverting output node INV. The second transistor M02 includes a first electrode connected to the inverting output node INV, a gate electrode to which the second scan signal SCAN2 is applied, and a second electrode connected to a VGL node (constant voltage node) to which the gate low voltage VGL is applied.

The NAND gate NAND includes third through sixth transistors M03 through M06.

The third transistor M03 is turned on when the voltage at the inverting output node INV is the gate low voltage VGL to supply the gate high voltage VGH to a NAND output node. The NAND output node may be connected to the gate electrode of the third switch element SW03 shown in FIG. 4, or to the gate electrode of the fifth switch element T05 shown in FIG. 6. The third transistor M03 is turned off when the voltage at the inverting output node INV is the gate high voltage VGH. The third transistor M03 includes a first electrode to which the gate high voltage VGH is applied, a gate electrode connected to the inverting output node INV, and a second electrode connected to the NAND output node.

The fourth transistor M04 is turned on when the EM signal EM is at the gate low voltage VGL to supply the gate high voltage VGH to the NAND output node. The fourth transistor M04 is turned off when the EM signal EM is at the gate high voltage VGH. The fourth transistor M04 includes a first electrode to which the gate high voltage VGH is applied, a gate electrode to which the EM signal EM is applied, and a second electrode connected to the NAND output node.

The fifth and sixth transistors M05 and M06 are turned on when the voltage at the inverting output node INV is the gate high voltage VGH and the voltage of the EM signal EM is the gate high voltage VGH, respectively, to connect the NAND output node to the VGL node to which the gate low voltage VGL is applied. The fifth transistor M05 is turned off when the voltage at the inverting output node INV is the gate low voltage VGL, and the sixth transistor M06 is turned off when the voltage of the EM signal INV is the gate low voltage VGL. The fifth transistor M05 includes a first electrode connected to the NAND output node, a gate electrode connected to the inverting output node INV, and a second electrode. The sixth transistor M06 includes a first electrode connected to the second electrode of the fifth transistor M05, a gate electrode to which an EM signal EM is applied, and a second electrode connected to the VGL node.

Referring to FIGS. 9 and 11, the internal gate signal generator GEN01 includes first to fifth transistors M11 to M15. This embodiment may reduce the number of transistors compared to the circuit shown in FIG. 10. The first to fifth transistors M11 to M15 may be implemented as n-channel transistors.

The NOT gate NOT includes the first and second transistors M11 and M12. The first transistor M11 acts as a diode that supplies the gate high voltage VGH to the inverting output node INV. The second transistor M12 is turned on according to the gate high voltage VGL of the second scan signal SCAN to connect the inverting output node INV to the VGL node, thereby reducing the voltage at the inverting output node INV to the gate low voltage VGL. The first transistor M11 includes a gate electrode connected to a first electrode to which the gate high voltage VGH is applied, and a second electrode connected to the inverting output node INV. The second transistor M12 includes a first electrode connected to the inverting output node INV, a gate electrode to which the second scan signal SCAN2 is applied, and a second electrode connected to the VGL node to which the gate low voltage VGL is applied.

The NAND gate NAND includes third to fifth transistors M13, M14, and M15.

The third transistor M13 acts as a diode that supplies the gate high voltage VGH to the NAND output node. The NAND output node may be connected to the gate electrode of the fifth switch element T05 in FIG. 6. The third transistor M13 includes a gate electrode connected to a first electrode to which the gate high voltage VGH is applied, and a second electrode connected to the NAND output node.

Fourth and fifth transistors M14 and M15 are turned on when the voltage at the inverting output node INV is the gate high voltage VGH and the voltage of the EM signal EM is the gate high voltage VGH, respectively, to connect the NAND output node to the VGL node. The fourth transistor M14 is turned off when the voltage at the inverting output node INV is the gate low voltage VGL, and the fifth transistor M15 is turned off when the voltage of the EM signal INV is the gate low voltage VGL. The fourth transistor M14 includes a first electrode connected to the NAND output node, a gate electrode connected to the inverting output node INV, and a second electrode. The fifth transistor M15 includes a first electrode connected to the second electrode of the fourth transistor M14, a gate electrode to which the EM signal EM is applied, and a second electrode connected to the VGL node.

Referring to FIGS. 9 and 12, the internal gate signal generator GEN01 includes first to fifth transistors M21 to M25. The first to fifth transistors M21 to M25 may be implemented as n-channel transistors.

The NOT gate NOT includes the first and second transistors M21 and M22. The first transistor M21 includes a first electrode to which the gate high voltage VGH is applied, a gate electrode connected to the inverting output node INV, and a second electrode. The second transistor M12 includes a first electrode connected to the inverting output node INV, a gate electrode to which the second scan signal SCAN2 is applied, and a second electrode connected to the VGL node.

The NAND gate NAND includes third to fifth transistors M23, M24, and M25.

The third transistor M23 includes a first electrode to which the gate high voltage VGH is applied, a gate electrode connected to the NAND output node, and a second electrode. The fourth transistor M24 includes a first electrode connected to the NAND output node, a gate electrode connected to the inverting output node INV, and a second electrode. The fifth transistor M25 includes a first electrode connected to the second electrode of the fourth transistor M24, a gate electrode to which the EM signal EM is applied, and a second electrode connected to the VGL node.

Figure 13:
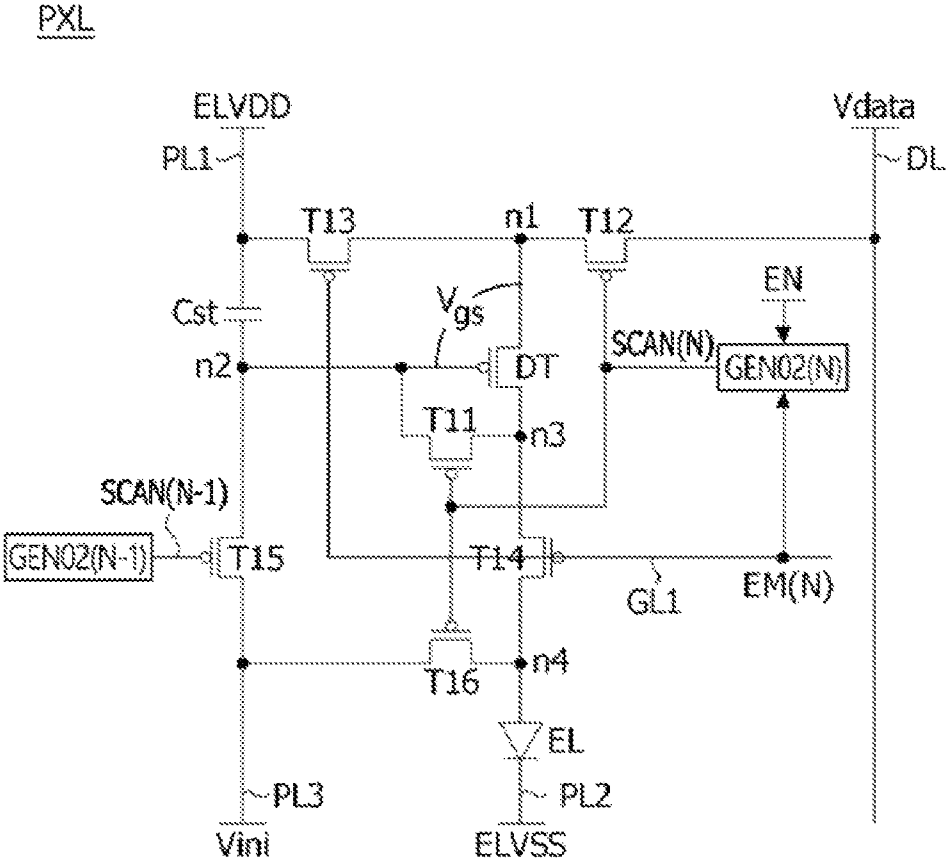
FIG. 13 is a circuit diagram illustrating a pixel circuit in detail according to another embodiment of the present disclosure.
Figure 14:
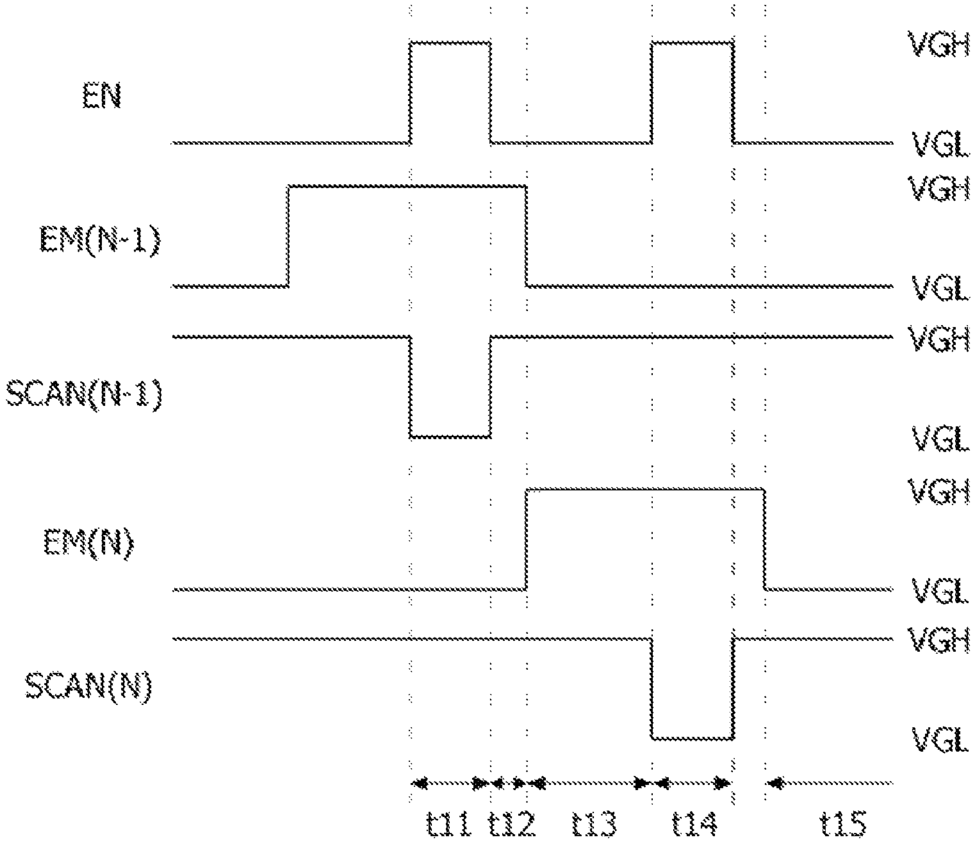
FIG. 14 is a waveform diagram illustrating gate signals inputted to the pixel circuit PXL shown in FIG. 13.

FIG. 13 is a circuit diagram illustrating a pixel circuit in detail according to another embodiment of the present disclosure. It should be noted that this pixel circuit is a pixel circuit PXL of sub-pixels disposed in an Nth pixel circuit (where N is a positive integer greater than or equal to 2), which is an example of, but not limited to, the pixel circuit PXL of the embodiment shown in FIG. 5. FIG. 14 is a waveform diagram illustrating gate signals inputted to the pixel circuit PXL shown in FIG. 13. In FIG. 14, EM(N−1) and SCAN(N−1) are gate signals applied to sub-pixels of the (N−1)th and Nth pixel lines. The (N−1)th scan signal SCAN(N−1) is outputted from an internal gate signal generator GEN02(N−1) embedded in the pixel circuit PXL of the (N−1)th pixel line, and the Nth scan signal SCAN(N) is outputted from an internal gate signal generator GEN02(N) embedded in the pixel circuit PXL of the Nth pixel line.

Referring to FIGS. 13 and 14, the pixel circuit PXL includes a light emitting element EL, a driving element DT for driving the light emitting element EL, a plurality of switch elements T1 to T16, a capacitor Cst, and an Nth internal gate signal generator GEN02(N). The driving element DT and the switch elements T11 to T15 may be implemented as, but not limited to, p-channel transistors.

The pixel circuit PXL is connected to the data line DL to which the data voltage Vdata is applied, and to a gate line GL1 to which the EM signal EM(N) is applied. The pixel circuit is connected to power nodes to which DC voltages (or constant voltages) are applied, such as a first constant voltage node PL1 to which the pixel driving voltage ELVDD is applied, a second constant voltage node PL2 to which the pixel ground voltage ELVSS is applied, and a third constant voltage node PL3 to which the initialization voltage Vini. On the display panel 100, the power lines to which the constant voltage nodes are connected may be commonly connected to all pixels.

The gate signals SCAN(N−1), SCAN(N), EM(N−1), and EM(N) include pulses that swing between the gate low voltage VGL and the gate high voltage VGH. The scan signals SCAN(N−1) and SCAN(N) correspond to the second gate signal Gout12 shown in FIG. 5. The EM signal EM(N−1) and EM(N) corresponds to the first gate signal Gout11 shown in FIG. 5.

The switch elements T11 to T16 constitute an internal compensation circuit. In FIG. 14, the internal compensation circuit initializes the pixel circuit PXL during initialization periods t11 to t13, and then stores the data voltage Vdata compensated by the amount of the threshold voltage of the driving element DT in the capacitor Cst during a sensing period t14. Subsequently, during a light emission period t15, the current generated from the driving element DT according to a gate-source voltage Vgs of the driving element DT is supplied to the light emitting element EL to drive the light emitting element EL. Hereinafter, the structure and operation of the pixel circuit PXL will be described, focusing on the pixel circuit PXL disposed in the Nth pixel line.

An initialization period of the Nth pixel line may be divided into t11, t12, and t13. During a period t11, the (N−1)th scan signal SCAN(N−1) and the Nth EM signal EM(N) applied to the Nth pixel line are at the gate low voltage VGL, and the Nth scan signal SCAN(N) is at the gate high voltage VGH. During the period t11, third to fifth switch elements T13 to T15 are turned on, and first, second, and sixth switch elements T11, T12, and T16 are turned off. During a period t12, the Nth EM signal EM(N) applied to the Nth pixel line is at the gate low voltage VGL, and the (N−1)th scan signal SCAN(N−1) and the Nth scan signal SCAN(N) are at the gate high voltage VGH. During the period t12, the third and fourth switch elements T13 and T14 are turned on, and the other switch elements T11, T12, T15, and T16 are turned off.

During a period t13, the gate signals SCAN(N−1), SCAN (N), and EM(N) applied to the Nth pixel line are at the gate high voltage VGH. During the period t13, the switch elements T11 to T16 are turned off to float major nodes n1 to n4.

During a sensing period t14, the Nth scan signal SCAN (N) applied to the Nth pixel line is at the gate low voltage VGL, and the (N−1)th scan signal SCAN(N−1) and the Nth EM signal EM are at the gate high voltage VGH. During the sensing period t14, the first, second, and sixth switch elements T11, T12, and T16 are turned on, and the other switch elements T13, T14, and T15 are turned off.

During the emission period t15, the Nth EM signal EM(N) applied to the Nth pixel line is at the gate low voltage VGL, and the (N−1)th and Nth scan signals SCAN(N−1) and SCAN(N) are at the gate high voltage VGH. During a light emitting period t4, the third and fourth switch elements T13 and T14 are turned on, and the other switch elements T11, T12, T15, and T16 are turned off.

The driving element DT drives the light emitting element EL by supplying current to the light emitting element EL according to the gate-source voltage Vgs. The driving element DT includes a first electrode connected to a first node n1, a gate electrode connected to a second node n2, and a second electrode connected to a third node n3. A capacitor Cst is connected between a first constant voltage node PL1, to which the pixel driving voltage ELVDD is applied, and a second node n2.

The light emitting element EL includes an anode electrode connected to a fourth node n4, a cathode electrode connected to a second constant voltage node PL02 to which the pixel base voltage ELVSS is applied, and an organic compound layer interposed between the anode electrode and the cathode electrode. The light emitting element EL may be driven by the current from the driving element DT to emit light with a brightness corresponding to a gray scale value of the pixel data.

The switch element SW12 shown in FIG. 5 may include the first, second, fifth, and sixth switch elements T11, T12, T15, and T16 in FIG. 13.

The first switch element T11 is turned on according to the gate low voltage VGL of the Nth scan signal SCAN(N) to connect the gate electrode of the driving element DT and the second electrode of the driving element DT. The first switch element T11 includes a first electrode connected to the second node n2, a gate electrode to which the Nth scan signal SCAN(N) from the Nth internal gate signal generator GEN02(N) is applied, and a second electrode connected to the third node n3.

The second switch element T12 is turned on according to the gate low voltage VGL of the Nth scan signal SCAN(N) to apply the data voltage Vdata of the pixel data to the first electrode of the drive element DT. The second switch element T12 includes a first electrode connected to the first node n1, a gate electrode to which the Nth scan signal SCAN(N) from the Nth internal gate signal generator GEN02(N) is applied, and a second electrode connected to the data line DL to which the data voltage Vdata is applied.

The third switch element T13 is turned on according to the gate low voltage VGL of the Nth EM signal EM(N) to supply the pixel driving voltage ELVDD to the first electrode of the driving element DT. The third switch element T13 includes a first electrode connected to the first constant voltage node PL1, a gate electrode connected to the gate line GL1 to which the Nth EM signal EM(N) is applied, and a second electrode connected to the first node n1.

The fourth switch element T14 is turned on according to the gate low voltage VGL of the Nth EM signal EM(N) to connect the second electrode of the driving element DT to the anode electrode of the light emitting element EL. The fourth switch element T14 includes a first electrode connected to the third node n3, a gate electrode connected to the gate line GL1 to which the Nth EM signal EM(N) is applied, and a second electrode connected to the fourth node n4.

The fifth switch element T15 is turned on according to the gate low voltage VGL of the (N−1)th scan signal SCAN (N−1) to apply the initialization voltage Vini to the second node n2. The (N−1)th internal gate signal generator GEN02 (N−1) disposed in the (N−1)th pixel line outputs the (N−1)th scan signal SCAN(N−1). The fifth switch element T15 includes a first electrode connected to the second node n2, a gate electrode to which the (N−1)th scan signal SCAN (N−1) from the (N−1)th internal gate signal generator GEN02(N−1) is applied, and a second electrode connected to the third constant voltage node PL3 to which the initialization voltage Vini is applied.

The sixth switch element T16 is turned on according to the gate low voltage VGL of the Nth scan signal SCAN(N) to apply the initialization voltage Vini to the anode electrode of the light emitting element EL. The sixth switch element T16 includes a first electrode connected to the third constant voltage node PL3, a gate electrode to which the Nth scan signal SCAN(N) from the Nth internal gate signal generator GEN02(N) is applied, and a second electrode connected to the fourth node n4.

Figure 15:
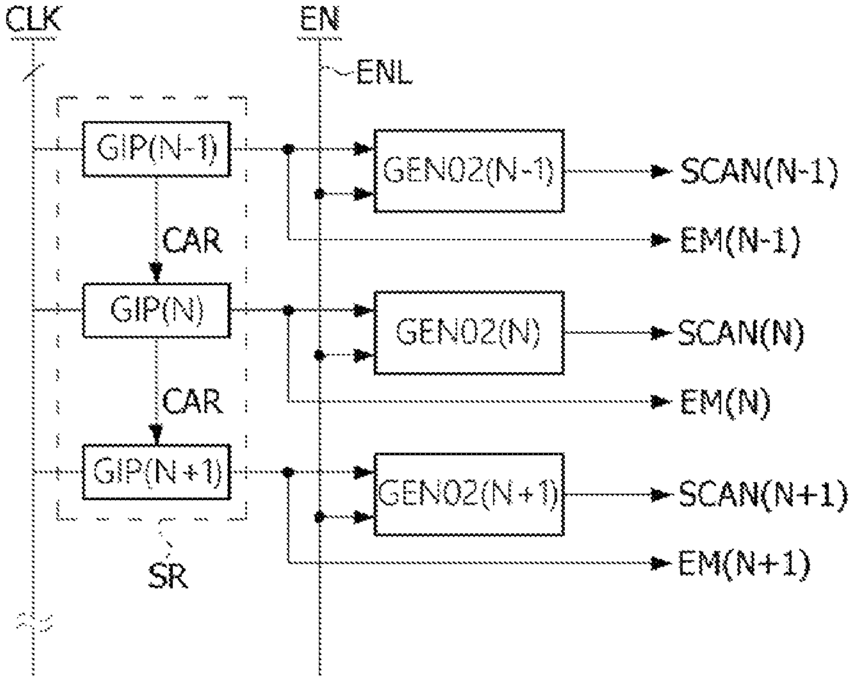
FIG. 15 is a diagram illustrating a circuit for outputting gate signals to be applied to the pixel circuit shown in FIG. 13.

FIG. 15 is a diagram illustrating a circuit for outputting gate signals to be applied to the pixel circuit shown in FIG. 13.

Referring to FIG. 15, the gate driver 120 includes a shift register SR that outputs the EM signals EM(N−1), EM(N), and EM(N+1) sequentially. The shift register SR includes (N−1)th to (N+1)th gate drivers GIP(N−1), GIP(N), and GIP(N+1) that receive a shift clock CLK as input and are connected in cascade via carry signal lines CAR.

At least one pixel circuit disposed in the (N−1)th pixel line includes an (N−1)th internal gate signal generator GEN02(N−1). At least one pixel circuit disposed in the Nth pixel line includes an Nth internal gate signal generator GEN02(N). At least one pixel circuit disposed in the (N+1)th pixel line includes an (N+1)th internal gate signal generator GEN02(N+1).

The enable signal EN may be commonly inputted to the internal gate signal generators GEN02(N−1), GEN02(N), and GEN02(N+1) via the enable signal line ENL.

The (N−1)th internal gate signal generator GEN02(N−1) receives the (N−1)th EM signal EM(N−1) from the (N−1)th gate driver GIP(N−1) and the enable signal EN, and outputs the (N−1)th scan signal SCAN(N−1). Next, the Nth internal gate signal generator GEN02(N) receives the Nth EM signal EM(N) and the enable signal EN from the Nth gate driver GIP(N) as input, and outputs the Nth scan signal SCAN(N). Next, the (N+1)th internal gate signal generator GEN02(N+1) receives the (N+1)th EM signal EM(N+1) from the (N+1)th gate driver GIP(N+1) and the enable signal EN as input, and outputs the (N+1)th scan signal SCAN(N+1).

Figure 16:
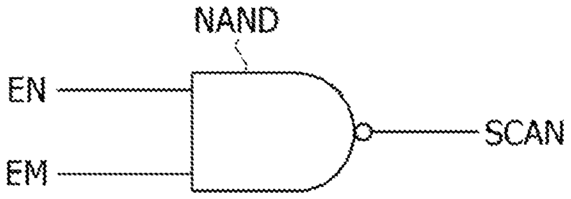
FIG. 16 is a circuit diagram schematically illustrating logic gates and a truth table of the internal gate signal generator shown in FIGS. 13 and 15.

FIG. 16 is a diagram illustrating a logic gate and a truth table of the internal gate signal generator shown in FIGS. 13 and 15.

Referring to FIG. 16, the internal gate signal generator GEN02 includes a NAND gate NAND that receives the EM signal EM and the enable signal EN as input and outputs the scan signal SCAN.

The truth table shown in FIG. 16 shows the inputs and outputs of the NAND gate NAND. In FIG. 14, when the gate low voltage VGL is 'O' and the gate high voltage VGH is '1', the logical values of the waveform for each section of the waveform diagram shown in FIG. 14 coincide with the truth table shown in FIG. 16.

Figure 17:
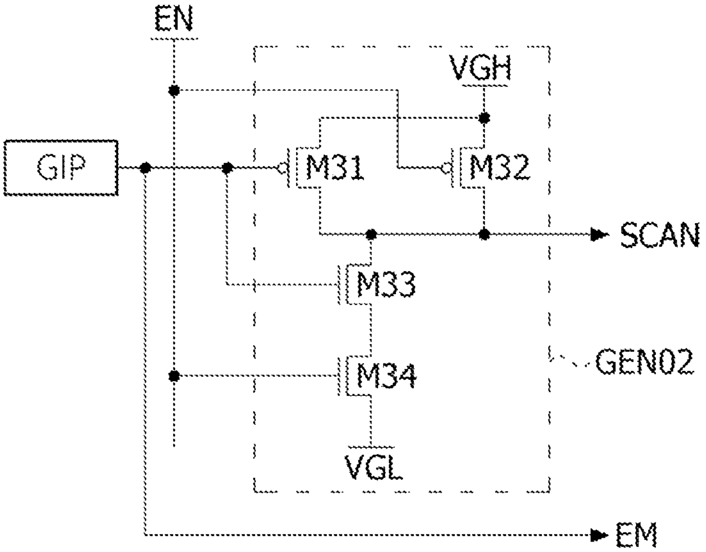
FIGS. 17 to 19 are circuit diagrams illustrating in detail the internal gate signal generator shown in FIG. 16.
Figure 18:
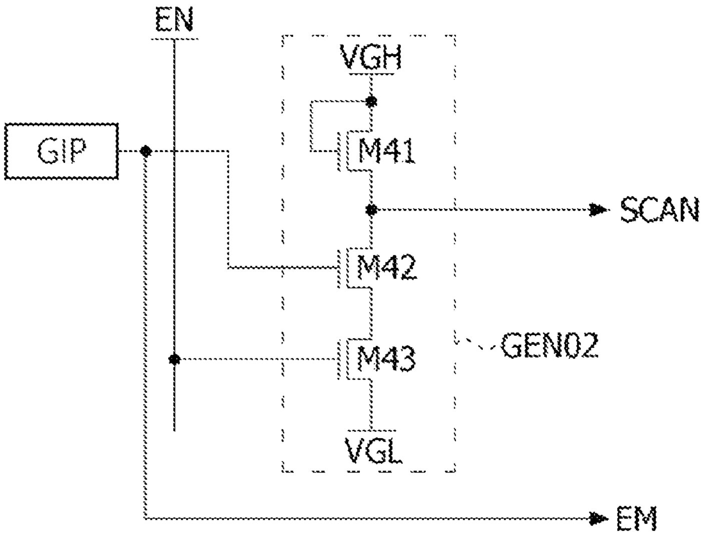
Figure 19:
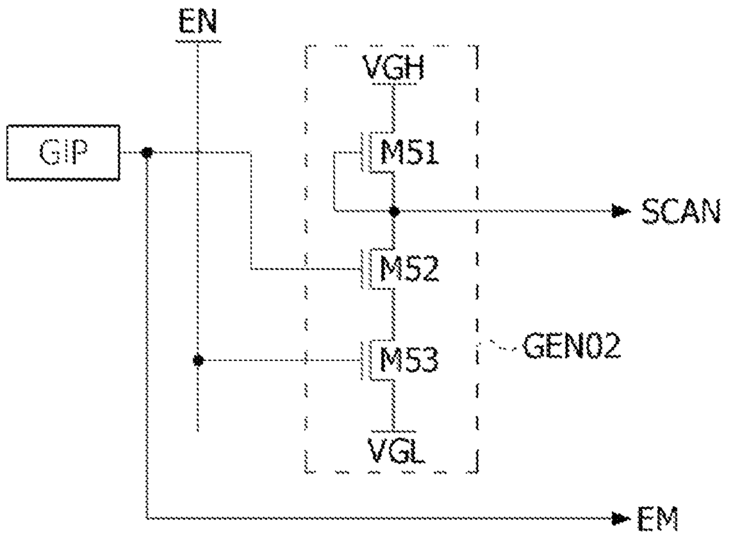

FIGS. 17 to 19 are circuit diagrams illustrating in detail the internal gate signal generator shown in FIG. 16.

Referring to FIGS. 16 and 17, the internal gate signal generator GEN02 includes first to fourth transistors M31 to M36. First and second transistors M31 and M32 may be p-channel transistors, and third and fourth transistors M33 and M34 may be n-channel transistors.

The first transistor M31 is turned on when the EM signal EM from the gate driver GIP is at the gate low voltage VGL to supply the gate high voltage VGH to the NAND output node. The NAND output node may be connected to the gate electrode of the second switch element SW12 shown in FIG. 5, to the gate electrodes of the first, second, and sixth switch elements T11, T12, and T16 shown in FIG. 13, or to the gate electrode of the fifth switch element T15. The first transistor M31 is turned off when the voltage of the EM signal EM is the gate high voltage VGH. The first transistor M31 includes a first electrode to which the gate high voltage VGH is applied, a gate electrode to which the EM signal EM is applied, and a second electrode connected to the NAND output node.

The second transistor M32 is turned on when the enable signal EN is at the gate low voltage VGL to supply the gate high voltage VGH to the NAND output node. The second transistor M32 is turned off when the enable signal EN is at the gate high voltage VGH. The second transistor M32 includes a first electrode to which the gate high voltage VGH is applied, a gate electrode to which the enable signal EN is applied, and a second electrode connected to the NAND output node.

The third and fourth transistors M33 and M34 are turned on when the voltage of the EM signal EM is the gate high voltage VGH and the voltage of the enable signal EN is the gate high voltage VGH, respectively, to connect the NAND output node to the VGL node. The third transistor M33 is turned off when the voltage of the EM signal EM is the gate low voltage VGL, and the fourth transistor M34 is turned off when the voltage of the enable signal EN is the gate low voltage VGL. The third transistor M33 includes a first electrode connected to the NAND output node, a gate electrode to which the EM signal EM is applied, and a second electrode. The fourth transistor M34 includes a first electrode connected to the second electrode of the third transistor M33, a gate electrode to which the enable signal EN is applied, and a second electrode connected to the VGL node.

Referring to FIGS. 16 and 18, the internal gate signal generator GEN02 includes first to third transistors M41, M42, and M43. This embodiment may reduce the number of transistors compared to the circuit shown in FIG. 17. The first to third transistors M41, M42, and M43 may be implemented as n-channel transistors.

The first transistor M41 operates as a diode that supplies the gate high voltage VGH to the NAND output node. The first transistor M41 includes a gate electrode connected to a first electrode to which the gate high voltage VGH is applied, and a second electrode connected to the NAND output node.

The second and third transistors M42 and M43 are turned on when the voltage of the EM signal EM is the gate high voltage VGH and the voltage of the enable signal EN is the gate high voltage VGH, respectively, to connect the NAND output node to the VGL node. The second transistor M42 is turned off when the voltage of the EM signal EM is the gate low voltage VGL, and the third transistor M43 is turned off when the voltage of the enable signal EN is the gate low voltage VGL. The second transistor M42 includes a first electrode connected to the NAND output node, a gate electrode to which the EM signal EM is applied, and a second electrode. The third transistor M43 includes a first electrode connected to the second electrode of the second transistor M42, a gate electrode to which an enable signal EN is applied, and a second electrode connected to the VGL node.

Referring to FIGS. 16 and 19, the internal gate signal generator GEN02 includes first to third transistors M51, M52, and M53. The first to third transistors M51, M52, and M53 may be implemented as n-channel transistors.

The first transistor M51 includes a first electrode to which the gate high voltage VGH is applied, a gate electrode connected to the NAND output node, and a second electrode. The second transistor M52 includes a first electrode connected to the NAND output node, a gate electrode to which the EM signal EM is applied, and a second electrode. The third transistor M53 includes a first electrode connected to the second electrode of the second transistor M52, a gate electrode to which an enable signal EN is applied, and a second electrode connected to the VGL node.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A pixel circuit comprising:

one or more first switch elements configured to be turned on based on a first gate signal;

one or more second switch elements configured to be turned on based on a second gate signal;

one or more third switch elements configured to be turned on based on a third gate signal;

an internal gate signal generator configured to receive the first gate signal and the second gate signal to output the third gate signal; and a driving element configured to drive a light emitting element, wherein the first to third switch elements are electrically connected to the driving element.

2. The pixel circuit of claim 1, wherein the internal gate signal generator includes:

a NOT gate configured to receive the first gate signal as input; and a NAND gate configured to receive an output signal of the NOT gate and the second gate signal as input and output the third gate signal.

3. The pixel circuit of claim 1, wherein the internal gate signal generator includes:

a first transistor including a first electrode to which a gate high voltage is applied, a gate electrode to which the first gate signal is applied, and a second electrode electrically connected to an inverting output node from which an inverted signal of the first gate signal is outputted;

a second transistor including a first electrode electrically connected to the inverting output node, a gate electrode to which the first gate signal is applied, and a second electrode electrically connected to a gate low voltage (VGL) node to which a gate low voltage is applied;

a third transistor including a first electrode to which the gate high voltage is applied, a gate electrode electrically connected to the inverting output node, and a second electrode electrically connected to the gate electrode of the third switch element;

a fourth transistor including a first electrode to which the gate high voltage is applied, a gate electrode to which the second gate signal is applied, and a second electrode electrically connected to the gate electrode of the third switch element;

a fifth transistor including a first electrode electrically connected to the gate electrode of the third switch element, a gate electrode electrically connected to the inverting output node, and a second electrode; and a sixth transistor including a first electrode electrically connected to the second electrode of the fifth transistor, a gate electrode to which the second gate signal is applied, and a second electrode electrically connected to the VGL node, wherein each of the first, third and fourth transistors is a p-channel transistor, and each of the second, fifth and sixth transistors is an n-channel transistor.

4. The pixel circuit of claim 1, wherein the internal gate signal generator includes:

a first transistor including a first electrode to which a gate high voltage is applied, and a second electrode electrically connected to an inverting output node from which an inverted signal of the first gate signal is outputted;

a second transistor including a first electrode electrically connected to the inverting output node, a gate electrode to which the first gate signal is applied, and a second electrode electrically connected to a VGL node to which a gate low voltage is applied;

a third transistor including a gate electrode electrically connected to a first electrode to which the gate high voltage is applied, and a second electrode electrically connected to the gate electrode of the third switch element;

a fourth transistor including a first electrode electrically connected to the gate electrode of the third switch element, a gate electrode electrically connected to the inverting output node, and a second electrode; and a fifth transistor including a first electrode electrically connected to the second electrode of the fourth transistor, a gate electrode to which the second gate signal is applied, and a second electrode electrically connected to the VGL node, wherein each of the first to fifth transistors is an n-channel transistor.

5. The pixel circuit of claim 1, wherein the internal gate signal generator includes:

a first transistor including a first electrode to which a gate high voltage is applied, and a gate and second electrodes electrically connected to an inverting output node from which an inverted signal of the first gate signal is outputted;

a second transistor including a first electrode electrically connected to the inverting output node, a gate electrode to which the first gate signal is applied, and a second electrode electrically connected to a VGL node to which a gate low voltage is applied;

a third switch element including a first electrode to which the gate high voltage is applied, and a gate and second electrodes electrically connected to the gate electrode of the third switch element;

a fourth transistor including a first electrode electrically connected to the gate electrode of the third switch element, a gate electrode electrically connected to the inverting output node, and a second electrode; and a fifth transistor including a first electrode electrically connected to the second electrode of the fourth transistor, a gate electrode to which the second gate signal is applied, and a second electrode electrically connected to the VGL node, wherein each of the first to fifth transistors is an n-channel transistor.

6. The pixel circuit of claim 1, further comprising a capacitor, wherein the driving element includes a first electrode electrically connected to a first constant voltage node to which a pixel driving voltage is applied, a gate electrode electrically connected to a first node, and a second electrode electrically connected to a second node;

the light emitting element includes an anode electrode electrically connected to a fourth node, a cathode electrode connected to a second constant voltage node to which a pixel base voltage is applied, and an organic compound layer interposed between the anode electrode and the cathode electrode;

the capacitor is connected between the first node and a third node, and wherein the first switch element includes:

a first pixel switch element configured to be turned on according to a gate low voltage of the first gate signal to electrically connect the first node to the second node; and a second pixel switch element configured to be turned on according to the gate low voltage of the first gate signal to electrically connect the fourth node to a third constant voltage node to which a reference voltage is applied;

wherein the second switch element includes:

a third pixel switch element configured to be turned on according to a gate low voltage of the second gate signal to electrically connect the third node to the third constant voltage node; and a fourth pixel switch element configured to be turned on according to the gate low voltage of the second gate signal to electrically connect the second node to the fourth node, and wherein the third switch element includes:

a fifth pixel switch element configured to be turned on according to a gate low voltage of the third gate signal to apply a data voltage of pixel data to the third node, wherein each of the first to fifth of switch elements is a p-channel transistor.

7. A pixel circuit comprising:

one or more first switch elements configured to be turned on based on a first gate signal;

one or more second switch elements configured to be turned on based on a second gate signal;

an internal gate signal generator configured to receive an enable signal and the first gate signal to output the second gate signal; and a driving element configured to drive a light emitting element, and wherein the switch elements are electrically connected to the driving element.

8. The pixel circuit of claim 7, wherein the internal gate signal generator includes:

a NAND gate configured to receive the first gate signal and the enable signal as input and output the second gate signal.

9. The pixel circuit of claim 7, wherein the internal gate signal generator includes:

a first transistor including a first electrode to which a gate high voltage is applied, a gate electrode to which the first gate signal is applied, and a second electrode electrically connected to a gate electrode of the second switch element;

a second transistor including a first electrode to which the gate high voltage is applied, a gate electrode to which the enable signal is applied, and a second electrode electrically connected to the gate electrode of the second switch element;

a third transistor including a first electrode electrically connected to the gate electrode of the second switch element, a gate electrode to which the first gate signal is applied, and a second electrode; and a fourth transistor including a first electrode electrically connected to the second electrode of the third transistor, a gate electrode to which the enable signal is applied, and a second electrode electrically connected to a VGL node to which a gate low voltage is applied, wherein each of the first and second transistors is a p-channel transistor, and each of the third and fourth transistors is an n-channel transistor.

10. The pixel circuit of claim 7, wherein the internal gate signal generator includes:

a first transistor including a gate electrode electrically connected to a first electrode to which a gate high voltage is applied, and a second electrode electrically connected to a second gate electrode of the second switch element;

a second transistor including a first electrode electrically connected to a gate electrode of the second switch element, a gate electrode to which the first gate signal is applied, and a second electrode; and a third transistor including a first electrode electrically connected to the second electrode of the second transistor, a gate electrode to which the enable signal is applied, and a second electrode electrically connected to a VGL node to which a gate low voltage is applied, wherein each of the first to third transistors is an n-channel transistor.

11. The pixel circuit of claim 7, wherein the internal gate signal generator includes:

a first switch element including a first electrode to which a gate high voltage is applied, and a gate and second electrodes electrically connected to a gate electrode of the second switch element;

a second transistor including a first electrode electrically connected to a gate electrode of the second switch element, a gate electrode to which the first gate signal is applied, and a second electrode; and a third transistor including a first electrode connected to the second electrode of the second transistor, a gate electrode to which the enable signal is applied, and a second electrode electrically connected to a VGL node to which a gate low voltage is applied, wherein each of the first to third transistors is an n-channel transistor.

12. The pixel circuit of claim 7, further comprising a capacitor, wherein the driving element includes a first electrode electrically connected to a first node, a gate electrode electrically connected to a second node, and a second electrode electrically connected to a third node;

the capacitor is electrically connected between a first constant voltage node to which a pixel driving voltage is applied and the second node;

the light emitting element includes an anode electrode electrically connected to a fourth node, a cathode electrode electrically connected to a second constant voltage node to which a pixel base voltage is applied, and an organic compound layer interposed between the anode electrode and the cathode electrode;

the first gate signal includes an emission control signal;

the second gate signal includes an (N−1)th scan signal and an Nth scan signal;

wherein the second switch element includes:

a first pixel switch element configured to be turned on according to a gate low voltage of the Nth scan signal to electrically connect the second node to the third node;

a second pixel switch element configured to be turned on according to the gate low voltage of the Nth scan signal to apply a data voltage of pixel data to the first node;

a fifth pixel switch element configured to be turned on according to a gate low voltage of the (N−1)th scan signal to electrically connect a third constant voltage node to which an initialization voltage is applied to the second node; and a sixth pixel switch element configured to be turned on according to the gate low voltage of the Nth scan signal to electrically connect the third constant voltage node to the fourth node, wherein the first switch element includes:

a third pixel switch element configured to be turned on according to a gate low voltage of the emission control signal to electrically connect the first constant voltage node to the first node; and a fourth pixel switch element configured to be turned on according to the gate low voltage of the emission control signal to electrically connect the third node to the fourth node, and wherein N is a positive integer greater than or equal to 2, wherein each of the first to sixth pixel switch elements is an p-channel transistor.

13. A display device comprising:

a display panel in which a plurality of data lines, a plurality of gate lines, and a plurality of pixel circuits are disposed;

a data driver configured to output a data voltage of pixel data; and a gate driver configured to output a gate signal, wherein at least one of the pixel circuits includes an internal gate signal generator configured to output an internal gate signal.

14. The display device of claim 13, wherein the internal gate signal generator is configured to:

receive at least one gate signal from the gate driver as input to output the internal gate signal, and wherein the gate signal from the gate driver and the internal gate signal have different phases and different pulse widths; and wherein the pixel circuit includes at least one switch element controlled by the internal gate signal.

15. The display device of claim 13, further comprising:

a timing controller configured to supply pixel data of an input image to the data driver and control the gate driver and the internal gate signal generator, wherein an enable signal from the timing controller is supplied to the internal gate signal generator through a level shifter; and wherein the internal gate signal generator is configured to receive the gate signal from the gate driver and the enable signal to output the internal gate signal.

16. A mobile terminal comprising:

a display panel in which a plurality of data lines, a plurality of gate lines, and a plurality of pixel circuits are disposed, the display panel having a display area and a bezel area adjacent to the bezel area;

a drive IC configured to output a data voltage of pixel data;

a gate driver configured to output a gate signal; and a host system configured to supply the pixel data to the drive IC, wherein at least a portion of the gate driver is disposed in the bezel area of the display panel, and at least one of the pixel circuits includes an internal gate signal generator configured to output an internal gate signal.

17. The mobile terminal of claim 16, wherein the internal gate signal generator is configured to receive at least one gate signal from the gate driver as input to output the internal gate signal.

18. The mobile terminal of claim 16, wherein the drive IC is configured to output an enable signal, and wherein the internal gate signal generator is configured to receive the gate signal from the gate driver as input to output the internal gate signal.

19. The mobile terminal of claim 16, wherein the internal gate signal generator includes:

a first input configured to receive a first gate signal via a first gate line;

a second input configured to receive a second gate signal via a second gate line; and an output configured to generate a third gate signal based on the first gate signal and the second gate signal;

at least one first switch element configured to be turned on based on the first gate signal;

at least one second switch element configured to be turned on based on the second gate signal;

at least one third switch element configured to be turned on based on a third gate signal.

20. The mobile terminal of claim 16, wherein the internal gate signal generator includes:

a first input configured to receive a first gate signal via a first gate line;

a second input configured to receive an enable signal via an enable signal line; and an output configured to generate a second gate signal based on the first gate signal and the enable signal;

at least one first switch element configured to be turned on based on the first gate signal;

at least one second switch element configured to be turned on based on the second gate signal.

* * * * *